US007758214B2

(12) United States Patent
Lee et al.

(10) Patent No.: US 7,758,214 B2
(45) Date of Patent: Jul. 20, 2010

(54) LED LAMP

(75) Inventors: Tsung-Lung Lee, Taipei Hsien (TW); Xu-Hua Xiao, Shenzhen (CN); Li He, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 243 days.

(21) Appl. No.: 11/777,013

(22) Filed: Jul. 12, 2007

(65) Prior Publication Data

US 2009/0016062 A1 Jan. 15, 2009

(51) Int. Cl.
*F21V 29/00* (2006.01)
*B60Q 1/06* (2006.01)

(52) U.S. Cl. ....................... 362/294; 362/373; 362/218; 362/547; 362/800

(58) Field of Classification Search ................. 362/373, 362/294
See application file for complete search history.

(56) References Cited

U.S. PATENT DOCUMENTS 6,525,668 B1 * 2/2003 Petrick .................. 340/815.45
2005/0174780 A1 * 8/2005 Park ........................... 362/294
2006/0001384 A1 1/2006 Tain et al.
2006/0092639 A1 * 5/2006 Livesay et al. .............. 362/294
2007/0019419 A1 * 1/2007 Hafuka et al. ............... 362/373
2008/0253125 A1 * 10/2008 Kang et al. ................. 362/294

FOREIGN PATENT DOCUMENTS

CN 2881340 Y 3/2007

* cited by examiner

*Primary Examiner*—Sandra L O'Shea
*Assistant Examiner*—Sean P Gramling
(74) *Attorney, Agent, or Firm*—Jeffrey T. Knapp

(57) ABSTRACT

An LED lamp includes a heat dissipation apparatus, an LED module, a bulb and a reflector. The heat dissipation apparatus includes a first heat sink, a second heat sink and a heat conductor positioned between the first heat sink and the second heat sink. The LED module includes a plurality of LEDs mounted on the heat conductor. The bulb is seated on the first heat sink and the reflector is seated on the second heat sink. The reflector and the bulb together form a housing for receiving the LED module and the heat conductor therein. Heat pipes are used to thermally connect the heat conductor and the first and second heat sinks.

1 Claim, 4 Drawing Sheets

LED LAMP

BACKGROUND OF THE INVENTION

1. Field of the Invention

The present invention relates to an LED lamp, and particularly to an LED lamp having a heat dissipation apparatus for heat dissipation.

2. Description of Related Art

Light emitting diodes (LEDs) have rapidly developed in recent years, moving from being used strictly as indicators to also being used for illumination. With the features of long-term reliability and low power consumption, the LED is viewed as a promising alternative for future lighting products. Nevertheless, the rate of heat generation increases with the illumination intensity. This issue has become a challenge for thermal engineers to design the LED illumination.

What is needed, therefore, is an LED lamp which has a greater heat-dissipation capability.

SUMMARY OF THE INVENTION

An LED lamp comprises a heat dissipation apparatus, an LED module, a bulb and a reflector. The heat dissipation apparatus comprises a first heat sink, a second heat sink and a heat conductor positioned between the first heat sink and the second heat sink. The LED module comprises a plurality of LEDs mounted on the heat conductor. The bulb is seated on the first heat sink and the reflector is seated on the second heat sink. The reflector and the bulb together form a housing for receiving the LED module and the heat conductor therein.

BRIEF DESCRIPTION OF THE DRAWINGS

Many aspects of the present LED lamp can be better understood with reference to the following drawings. The components in the drawings are not necessarily drawn to scale, the emphasis instead being placed upon clearly illustrating the principles of the present LED lamp. Moreover, in the drawings, like reference numerals designate corresponding parts throughout the several views.

DETAILED DESCRIPTION OF THE INVENTION

Figure 1:
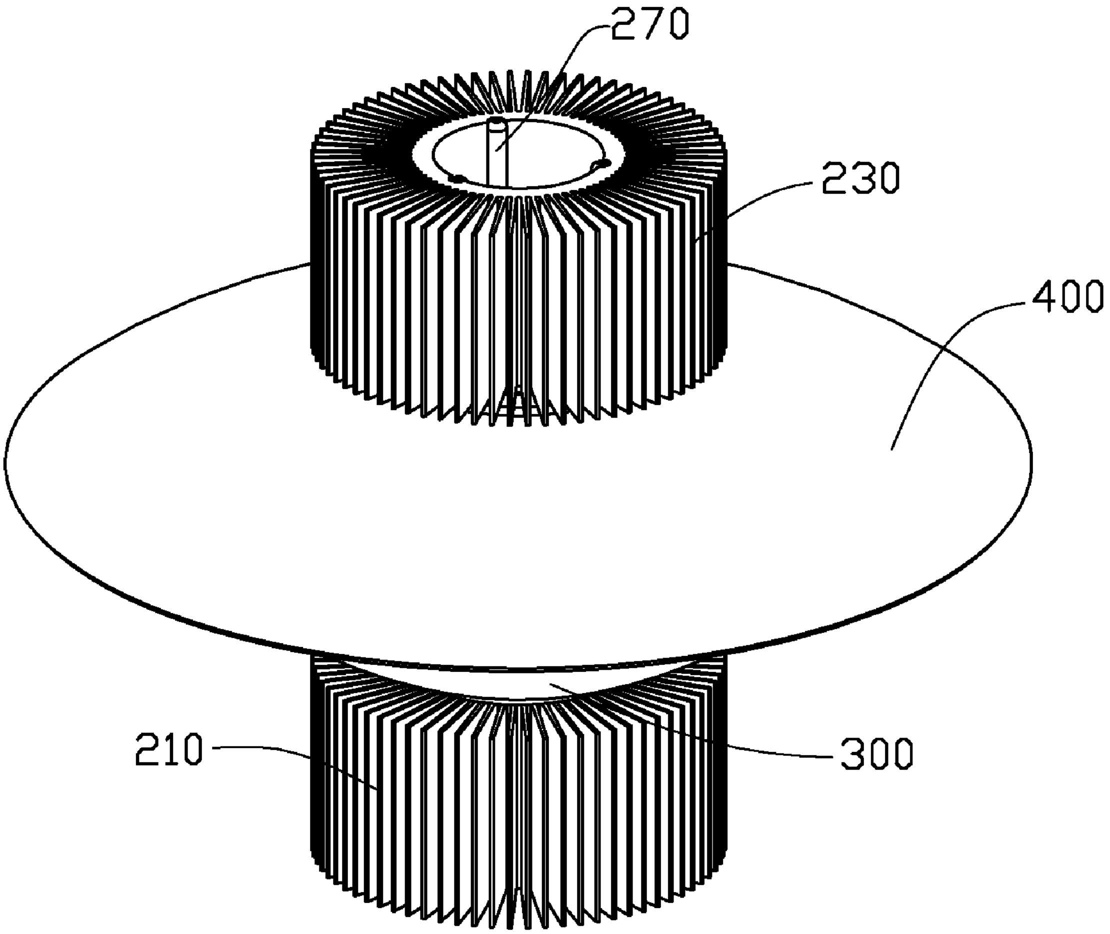
FIG. 1 is an isometric view of an LED lamp in accordance with a preferred embodiment of the present invention.
Figure 2:
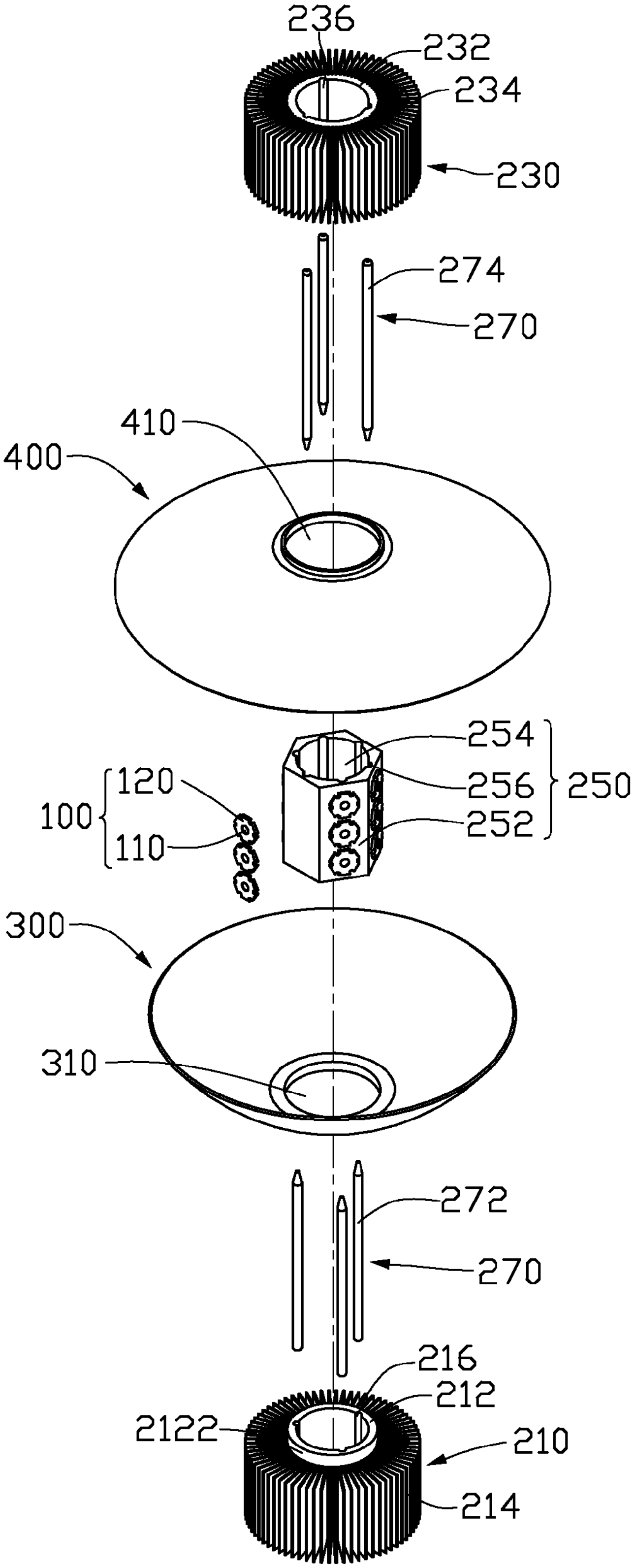
FIG. 2 is an exploded, isometric view of FIG. 1.
Figure 3:
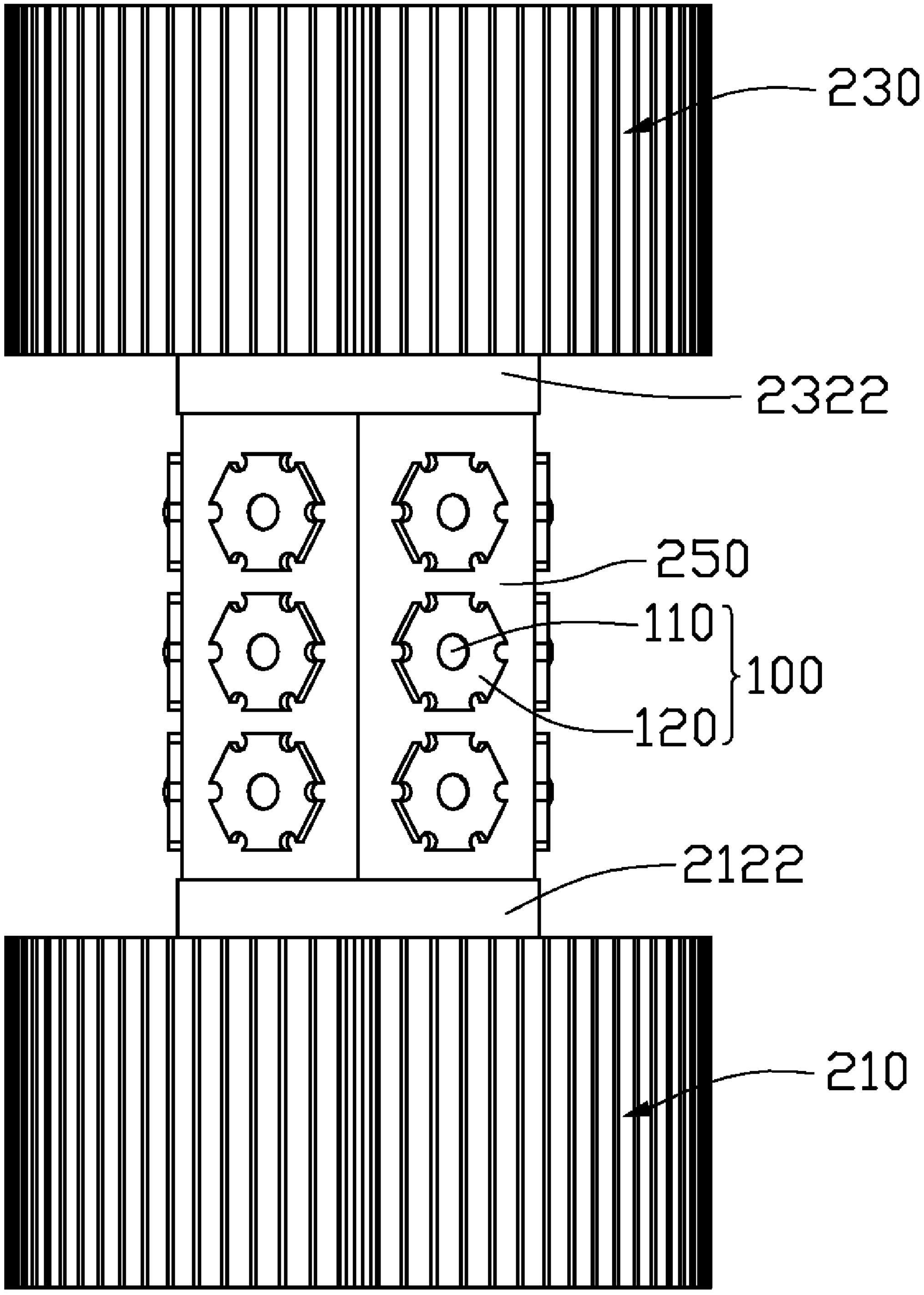
FIG. 3 is an assembled view of FIG. 2, with a bulb and a reflector of the LED lamp of FIG. 2 being removed away.
Figure 4:
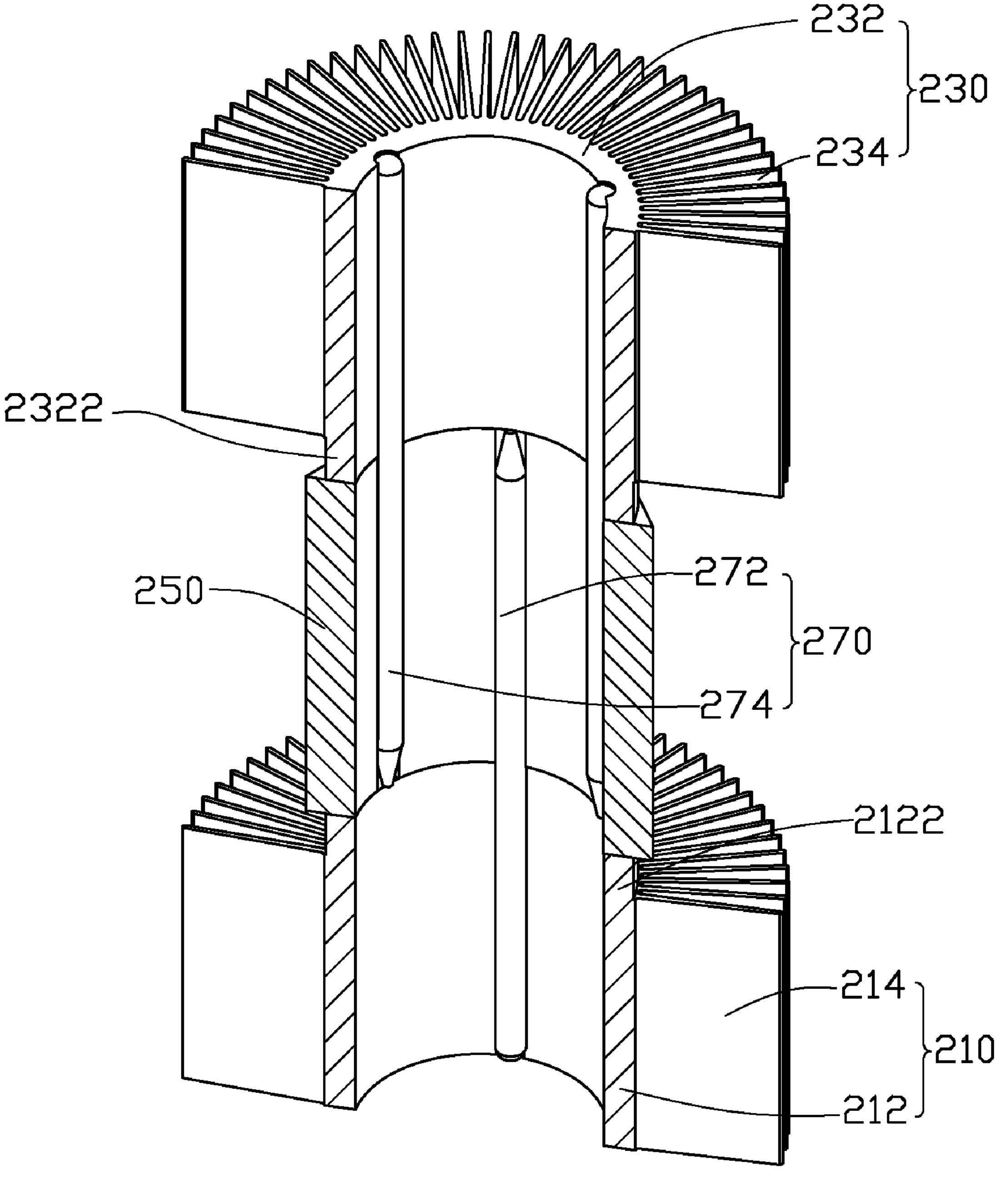
FIG. 4 is a cross-sectional view of FIG. 3.

Referring to FIGS. 1-4, an LED lamp of a preferred embodiment of the invention comprises an LED module 100, a heat dissipation apparatus 200 for supporting and cooling the LED module 100, a bulb 300 and a reflector 400 mounted on a middle portion of the heat dissipation apparatus 200.

The heat dissipation apparatus 200 comprises a first heat sink 210, a second heat sink 230, a heat conductor 250 positioned between the first and second heat sinks 210, 230, and a plurality of heat pipes 270 thermally connecting the heat conductor 250 to the first and second heat sinks 210, 230. The bulb 300 and the reflector 400 are positioned between the first and second heat sinks 210, 230 to receive the heat conductor 250 and the LED module 100 therein.

The bulb 300 is a bowl-shaped construction having an upper concave surface (not labeled) and a hole 310 defined in a central portion of the bulb 300. The hole 310 is provided for a top end portion 2122 of the first heat sink 210 extending therethrough, so that the bulb 300 is seated on the first heat sink 210. The bulb 300 is generally made of transparent plastic, glass, or other suitable material.

The reflector 400 is a bowl-shaped construction having a lower concave surface and a hole 410 defined in a central portion of the reflector 400. The hole 410 is provided for a lower end portion 2322 of the second heat sink 230 extending therethrough, so that the reflector 400 is seated on the second heat sink 230. The reflector 400 is used to reflect the light emitted from the LED module 100 downwardly. The reflector 400 is fitted over the bulb 300 to formed an enclosed housing for enabling the light emitted from the LED module 100 to pass through while preventing dust, insect or the like from entering the bulb 300 to affect the service life of the LED module 100. If desired, the reflector 400 may be omitted, and the bulb 300 may be directly attached between the first heat sink 210 and the second heat sink 230 to enclose the LED module 100 and the heat conductor 250 therein.

The LED module 100 generally comprises a plurality of LEDs 110 each mounted on a printed circuit board 120. The LEDs 110 are installed into the corresponding printed circuit boards 120 and electrically connected to the circuits (not shown) provided on the printed circuit boards 120. The printed circuit boards 120 are further electrically connected to a power (not shown) through wires (not shown) extending though the heat dissipation apparatus 200.

The LEDs 110 are mounted on a periphery of the heat conductor 250 to form a three-dimensional light source to increase illumination effect of the LED lamp. When the LEDs 110 are driven to produce light, heat from the LEDs 110 are first absorbed by the heat conductor 250, and then conducted away via the heat pipes 270 to the first and second heat sinks 210, 230 to be dissipated to ambient air.

In this embodiment, the heat conductor 250 is positioned between and engages with both of the first and second heat sinks 210, 230. The heat conductor 250 is a hollow structure, and has a hexagonal outer surface with six side surfaces 252 and a cylindrical inner surface 254. On each side surface 252 of the heat conductor 250, there are three LEDs 110 arranged in a line parallel to an axial direction of the heat conductor 250. Six channels 256 are symmetrically defined in the inner surface 254 of the heat conductor 250, and extend along the axial direction of the heat conductor 250. Each channel 256 is configured (i.e., structured and arranged) corresponding to one side surface 252 of the heat conductor 250, and is just beside the LEDs 110 mounted on the corresponding side surface 252. The channels 256 of the heat conductor 250 are provided to receive and retain parts of the heat pipes 270 therein.

The heat pipes 270 can be divided into two groups, namely first heat pipes 272 and second heat pipes 274. The first heat pipes 272 each has an upper part retained in one corresponding channel 256 of the heat conductor 250 and a lower part retained in the first heat sink 210. The second heat pipes 274 each has a lower part retained in one corresponding channel 256 of the heat conductor 250 and an upper part retained in the second heat sink 230. Moreover, the first heat pipes 272 and the second heat pipes 274 are arranged in alternating fashion in the heat conductor 250, so that heat produced by the LEDs 110 can be quickly and uniformly transferred to the first and second heat sinks 210, 230, respectively. In other words, part of the heat produced by the LEDs 110 is transferred downwardly to the first heat sink 210 via the first heat pipes 272; the other part of the heat produced by the LEDs 110 is transferred upwardly to the second heat sink 230 via the second heat pipes 274. Thus, the heat of the LEDs 110 can be quickly dissipated via the first and second heat sinks 210, 230. The detailed structures of the first and second heat sinks 210, 230 will be described in the following text.

The first heat sink 210 comprises a hollow and cylindrical base 212 and a plurality of fins 214 extending radially and outwardly from an outer periphery of the hollow base 212. A plurality of air passages is defined between adjacent fins 214 for airflow to pass therethrough. The base 212 has the top end portion 2122 thereof extending above a top surface of the fins 214. The top end portion 2122 extends through the hole 310 of the bulb 300 for positioning the bulb 300 thereon. A bottom portion of the first heat sink 210 is connected to a lamp base (not shown), such as a supporting stand. Three channels 216 are symmetrically defined in an inner wall of the base 212, and extend along an axial direction of the base 212, for receiving the lower parts of the first heat pipes 272 respectively.

The second heat sink 230 has same structure as the first heat sink 210, and it also comprises a hollow and cylindrical base 232, a plurality of fins 234 and three channels 236 for receiving the upper parts of the second heat pipes 274. The base 232 has the bottom end portion 2322 thereof extending below a bottom surface of the fins 234. The bottom end portion 2322 extends through the hole 410 of the reflector 400 for positioning the reflector 400 thereon.

The first heat sink 210, the second heat sink 230, the heat conductor 250 and the heat pipes 270 may be connected together via welding or other method. Then, the heat dissipation apparatus 200 is formed, and the bulb 300 and the reflector 400 are held between the first and second heat sinks 210, 230 to enclose the LED module 100 and the heat conductor 250 therein. In this manner the LED lamp is completed.

Since the second heat sink 230 is a hollow structure, a cover or a block may be positioned on a top portion of the second heat sink 230 to prevent rain, dust, insect or the like from entering the LED lamp to affect the service life of the LED lamp.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED lamp comprising:

a heat dissipation apparatus comprising a first heat sink, a second heat sink, and a heat conductor positioned between the first heat sink and the second heat sink;

an LED module comprising a plurality of LEDs mounted on the heat conductor;

a bulb seated on the first heat sink; and a reflector seated on the second heat sink and fitted over the bulb, the reflector and the bulb together forming a housing for receiving the LED module and the heat conductor therein, wherein light emitted from the LED module is reflected by the reflector downwardly and passes through the bulb;

wherein the heat dissipation apparatus further comprises a plurality of first heat pipes thermally engaging with the heat conductor and the first heat sink;

wherein the heat dissipation apparatus further comprises a plurality of second heat pipes thermally engaging with the heat conductor and the second heat sink;

wherein the first heat sink comprises a base and a plurality of fins mounted on the base, the first heat pipes partly attached to the base of first heat sink, and the second heat sink comprises a base and a plurality of fins mounted on the base of the second heat sink, the second heat pipes being partly attached to the base of the second heat sink;

wherein the base of the first heat sink has an end portion extending beyond the fins of the first heat sink, the end portion of the first heat sink extending through the bulb; and wherein the base of the second heat sink has an end portion extending beyond the fins of the second heat sink, the end portion of the second heat sink extending through the reflector.

* * * * *